Sept. 11, 1956  H. E. PARK  2,762,892
ELECTRICAL INDUCTION WELDING METHOD AND APPARATUS
Filed May 4, 1951  6 Sheets-Sheet 1

Fig. 1

INVENTOR.
HARWOOD E. PARK
BY
Gerald H. Peterson
Attorney

Sept. 11, 1956             H. E. PARK             2,762,892

ELECTRICAL INDUCTION WELDING METHOD AND APPARATUS

Filed May 4, 1951                                 6 Sheets-Sheet 2

INVENTOR.
HARWOOD E. PARK
BY
                   Attorney Sept. 11, 1956            H. E. PARK            2,762,892
ELECTRICAL INDUCTION WELDING METHOD AND APPARATUS
Filed May 4, 1951            6 Sheets-Sheet 3

INVENTOR.
HARWOOD E. PARK
BY
Gerald H. Peterson
Attorney

Sept. 11, 1956        H. E. PARK        2,762,892
ELECTRICAL INDUCTION WELDING METHOD AND APPARATUS
Filed May 4, 1951        6 Sheets-Sheet 4

INVENTOR.
HARWOOD E. PARK
BY
Attorney

Sept. 11, 1956

H. E. PARK 2,762,892

ELECTRICAL INDUCTION WELDING METHOD AND APPARATUS

Filed May 4, 1951

Sept. 11, 1956             H. E. PARK             2,762,892
ELECTRICAL INDUCTION WELDING METHOD AND APPARATUS
Filed May 4, 1951             6 Sheets-Sheet 6

INVENTOR.
HARWOOD E. PARK
BY
Attorney

United States Patent Office 2,762,892
Patented Sept. 11, 1956

2,762,892

ELECTRICAL INDUCTION WELDING METHOD AND APPARATUS

Harwood E. Park, Venice, Calif., assignor of one-third to Gerald H. Peterson, Santa Monica, Calif.

Application May 4, 1951, Serial No. 224,476

54 Claims. (Cl. 219—8.5)

This invention relates to a method and apparatus for induction heating, and particularly for welding by electrical induction heating, and more particularly to such induction welding in which the induction heating is concentrated on the faces being welded. While the invention as described has other uses, especially where concentration of heat generation is desirable, the invention has been developed primarily for the specific purpose of butt welding metal plate in a continuous process for fabricating large diameter pipe from sheet steel. This particular practice of the invention will be described herein by way of example to disclose and illustrate the underlying concepts and to provide adequate guidance for those skilled in the art for applying the same principles to other specific purposes.

This application is a continuation-in-part of my co-pending applications Serial No. 181,957, filed August 29, 1950, now abandoned, and Serial No. 204,160, filed January 3, 1951, now abandoned.

Known welding developments, including oxyacetylene welding, arc welding, atomic hydrogen welding, resistance welding, and flash welding, have come into wide practice because of advantages in speed and economy and in some instances because of special advantages for special processes. All these welding processes, however, involve serious disadvantages of non-uniform heating, excessive local over-heating of the metal far above the fusion point, or inclusion of foreign matter such as oxides or other contaminants between the welded surfaces in the resulting weld, or combinations of these disadvantages.

It is the general purpose of the present invention to provide an economical and efficient apparatus and process for welding by electrical induction and to provide a process for welding by electrical induction that makes possible the production of substantially better welds than heretofore produced, especially by a continuous process. More particularly it is the purpose of the present invention to provide such a welding process and apparatus especially useful for welding relatively large metal objects, for example, large diameter pipe and tanks, and such objects made of relatively thick metal. Furthermore, it is also the purpose of the present invention to effect such welding without the disadvantages of non-uniform heating of the welded metal surfaces and without the inclusion of contaminants such as oxides in the interface.

In accordance with my invention I have discovered that these purposes can be best obtained by following a number of guiding principles as generally indicated below.

It is especially desirable to concentrate the heat used to effect the desired welding in a narrow welding zone not only because it is uneconomical to heat a large mass of the metal but also because the internal stresses created by heating the metal should be localized as much as possible. The heating in the narrow zone should be uniform so as to avoid excessive temperature differentials which may leave large locked-up stresses in the resulting weld. High concentration of energy is exceedingly desirable both to obtain the desired welding temperature and to shorten the time required for welding. There should be exceedingly rapid heat generation in the metal to confine the heat in the metal during the welding heating to a narrow zone at the faces of the metal being welded.

It has been found in practice that the best results in accordance with my invention are obtained by heating the edges to be welded in such a manner that the welding temperature is reached only in the narrowest possible depth of the surfaces to be welded, since theoretically only the surface molecules may merge to completely unite the two metal faces and thus provide a substantially perfect weld.

In this connection the importance of not having contaminants such as oxides between the faces so as to leave such contaminants between the welded interface is emphasized in accordance with my invention. This avoidance of such contaminants in the interface is an exceedingly important advantage of my invention because it produces a higher quality weld than usually heretofore obtained, without resorting to some such disadvantageous step as excessive pushup or upset, as understood in the art, which is thought to be required by the art in an effort to push such contaminants as oxides out from between the surfaces being welded. In accordance with one embodiment of my invention the surfaces to be welded are cleaned in an inert or reducing atmosphere and maintained in such atmosphere up to and including the welding stage so that the surfaces being welded are assured of being clean.

It is extremely important in commercial practice that the apparatus and process for carrying out the welding be relatively simple, rugged, compact, and of reasonable cost, and the apparatus and process in accordance with my invention meet these requirements or demands of commercial feasibility or practicability to a surprising degree.

To relieve even the minor residual stresses that might be left in the weld made in accordance with my invention I provide means and include process steps in accordance with a preferred aspect of my invention for treating the metal before or after welding, by pre-heating or normalizing after welding, or both.

The invention is based principally on the successful utilization of induced eddy currents to generate welding heat in the metal that is to be interjoined. The restriction of the heat generation to a narrow welding zone and uniform heating at the desired locations are made possible by using eddy currents to heat the metal instead of current applied in the more usual ways and is accomplished by using a high frequency inductor in combination with a special laminated core construction to focus or concentrate the high frequency magnetic flux that creates the induced eddy currents.

High energy output concentrated in the relatively small area is accomplished by using certain principles working together to augment the effectiveness of the eddy currents in the selected narrow zone. Thus, for example, it becomes possible to raise the temperature of a narrow zone of ¼ inch plate at a rate of more than 250° F. per second so that a welding temperature on the order of 2500° F. can be reached in substantially less than 10 seconds starting with the metal at room temperature. Such concentration of energy output is made possible in commercial practice by using a special heat-resistance inductor construction that is a special feature of the invention as will be described.

A temperature gradient leading to peak value at the matching metal faces as the two faces are brought together under pressure is accomplished, in part and in accordance with my invention, by using current of suitably high frequency for a metal of given thickness, and in part by orientation and concentration of the magnetic flux at the most effective time and place, and more particularly in part by certain changes in relationship that build up the temperature gradient in the metal edges in a manner to trap heat at the metal edges as the metal edges approach merger. Localizing the heating current at the faces to be welded is accomplished by so arranging the core in relation to the spaced edges to be welded to direct high frequency magnetic flux between the faces of the edges to concentrate the induced current on the faces.

The production of a weld without contaminants such as oxides in the interface is made possible in accordance with my invention by effecting the weld of metal faces free of such contaminants, particularly by the arrangement more particularly described below of cleaning the faces, maintaining the faces clean, and effecting the welding of clean faces, all in an inert atmosphere. That structural simplicity and especially structural compactness for relatively low capital investment is obtained is clear when it is considered that an inductor unit constructed in accord with the present invention may be only 18 inches or less in length and 6 inches or less in diameter to generate sufficient heat for welding heavy metal plate moving past the inductor in a continuous welding process.

The preferred desired result of avoiding any undesirable effects of the heating cycle in the finished product is met by certain provisions as will be explained, including provisions for varying the temperature gradient as the metal progresses through the welding zone and provisions for heat treatment before and after the metal passes through this zone.

The features and advantages of invention may be understood from the following detailed description of particular embodiments thereof taken with the accompanying drawings.

In the drawings, which are to be regarded as merely illustrative.

*General arrangement*

Figure 1:
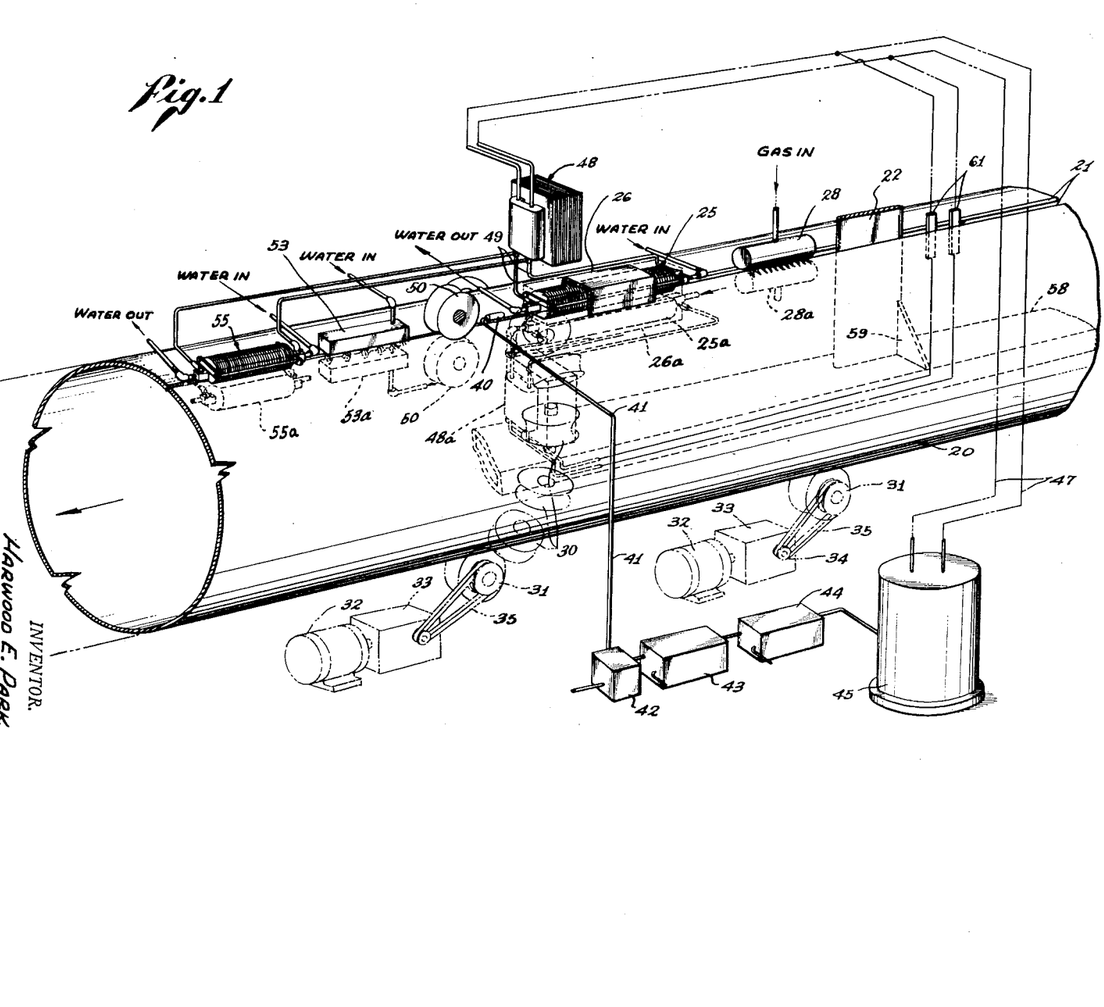
Fig. 1 is a perspective view, largely diagrammatic, of an embodiment of the invention for continuously welding large diameter pipe, parts of the structure being omitted for clarity of illustration.

The general arrangement of a preferred embodiment of apparatus for welding pipe from heavy sheet metal is shown in Fig. 1. The sheet metal 20 is rolled to form split cylinders having longitudinal edges 21 and it is contemplated that the longitudinally split cylinders will be moved through the apparatus at a constant rate in a continuous process. The ends of the cylinders may be held together as they are fed to the apparatus as by tack-welding, for example. As the welded cylinders emerge from the apparatus the tack welding at the ends of the cylinders may be severed or girth welds may be completed as desired.

As the split cylinders move into the apparatus they pass what may be called a splitter station represented by a vertical splitter bar 22 which holds the two longitudinal edges 21 of the metal apart to provide a gap or spacing between the two edges. The splitter bar may be, for example, two inches thick. At a substantial distance beyond the splitter bar 22 is an inductor unit generally designated 25 which preferably is enclosed on all sides except the bottom, that is, the part facing the edges to be welded, by a suitable hood 26. The purpose of the hood 26 is to confine a protective atmosphere throughout the region in which the metal edges are brought to welding temperature and forced together to form the butt weld. The protective atmosphere may be any gas or vapor or combination thereof that will prevent the formation of any undesirable compounds, especially oxides on the surfaces to be welded, which impair the resulting weld. The hood 26 may be made of asbestos and may be supplied with a suitable inert gas or reducing by a supply pipe (not shown) in a manner well understood in the art to assure that the welding is effected in an inert or reducing atmosphere, particularly with oxygen excluded. The purpose of providing the inert or reducing atmosphere surrounding the zone of welding is to avoid contaminants such as oxides in the interface of the resulting weld.

Figures 3, 4, 5:
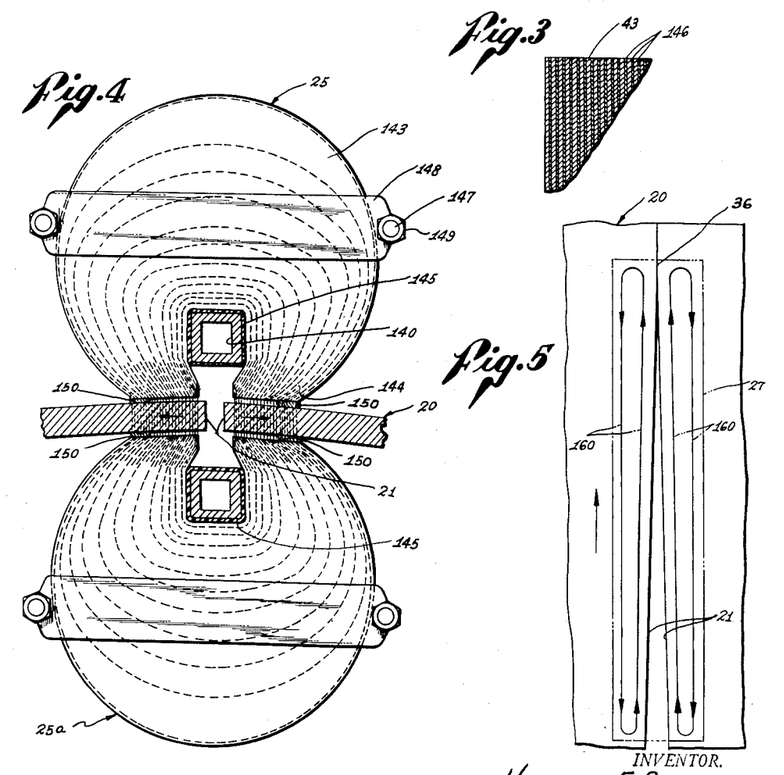
Fig. 3 is an enlarged fragmentary section of the inductor unit taken as indicated by the circle 3 in Fig. 2.
Fig. 4 is an enlarged view of the inductor unit, partly in end elevation and partly in section, taken as indicated by the line 4—4 of Fig. 2, showing also the lower inductor unit.
Fig. 5 is a diagrammatic plan view showing a representation of the general distribution of the eddy currents in the metal as the metal edges approach merger in the welding zone.

The inductor unit 25 by its concentrated energy output forms an elongated heating or welding zone along the metal edges 21, which zone may have the shape, for example, indicated by the dash-dot rectangle 27 in Fig. 5. In this zone the edges of the metal are brought up to a temperature of the order of 2500° F. for pressure welding. While the single inductor unit 25 may supply all the heat required to heat the metal from room temperature I prefer to provide some additional means between the splitter bar 22 and the inductor unit to pre-heat the metal, say, to a temperature of the order of 1000° F. A second inductor unit may be used for such pre-heating, or a gas burner such as shown at 28 may be used. The advantage of such pre-heating is that it avoids the thermal shock of an excessively rapid temperature rise.

Figures 6, 7:
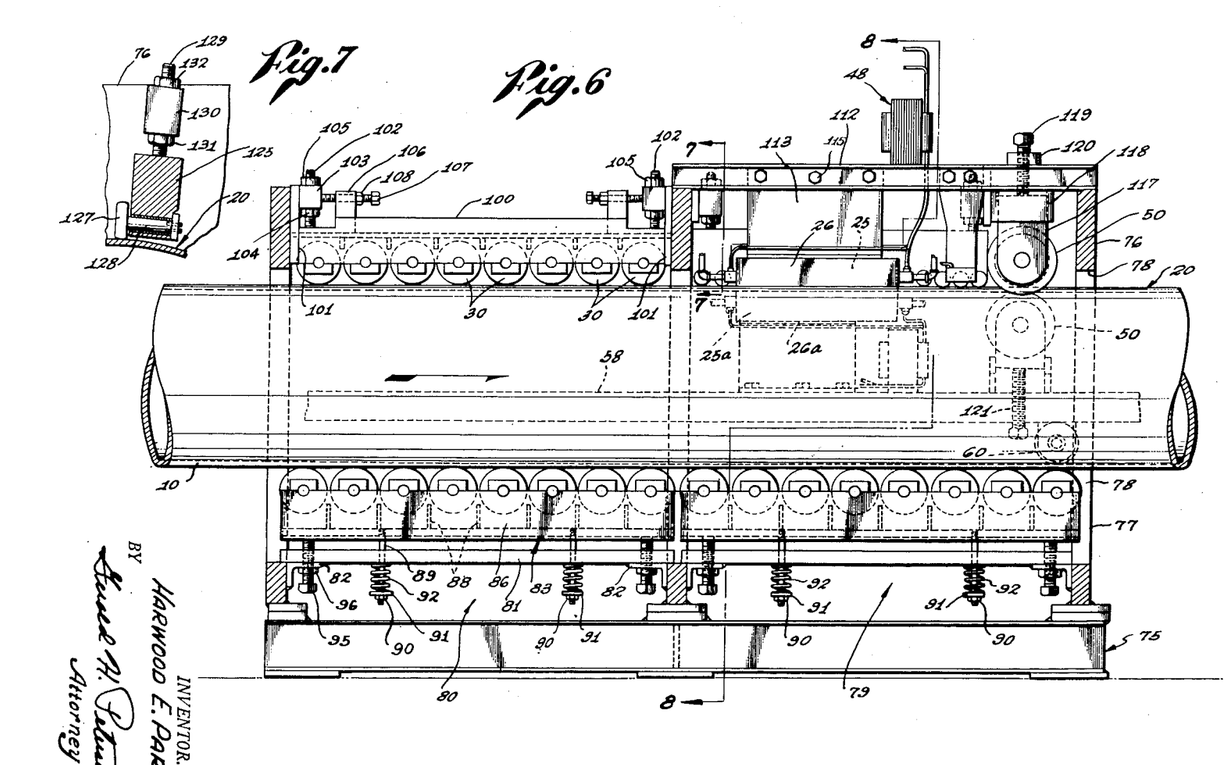
Fig. 6 is a view partly in side elevation and partly in section showing the roller assembly for moving the material longitudinally through the welding zone and simultaneously forcing the edges of the material together to form the butt weld; parts of the assembly being omitted for clarity.
Fig. 7 is a fragmentary section taken as indicated by the line 7—7 of Fig. 6.

Fig. 1 shows some of the rolls 30 of the roller assembly, which assembly is shown in more detail in Fig. 6. As indicated diagrammatically in Fig. 1, also included are suitable drive rolls 31 for moving the cylindrical material longitudinally through the apparatus, the drive rolls being powered by suitable motors 32. Each motor 32 is operatively connected to a speed-reducing mechanism in a housing 33 having a sprocket for driving the drive roll 31 through a sprocket chain 35.

The various rolls 30 surrounding the split metal cylinder are adjustable to contract the traveling cylinder to bring the two longitudinal edges of the cylinder together at what may be called the squeeze point, and the contraction of the cylinder is continued beyond the point of contact at the squeeze point for continued pressure to merge and upset the metal to form an efficient butt weld. It is contemplated that the squeeze point will occur in the region of the far end of the previously mentioned heating or welding zone 27. Thus the squeeze point may occur just inside the far end of the heating zone as shown at 36 in Fig. 5 or may occur a few inches beyond the far end of the heating zone, but in any event should occur within the inert atmosphere provided by the hood 26.

It should be noted however that, if the temperature of the heated edges is raised after contact, the expansion of the metal in the respective edges will also contribute to the pressure between the faces of the edges and contribute to producing an upset. Accordingly, in accordance with my invention, I may supply a part of the pressure between the surfaces to be welded by continuing the heating to further raise the temperature of the metal in the edges after the edges are brought into contact.

The fact that the metal is held two inches apart by the splitter bar 22 and is subsequently brought together in or near the heating zone under the inductor unit 25 aligns the longitudinal edges of the metal convergently to form a gradually tapered air gap between the metal edges. The taper is of course governed by the distance between the splitter bar 22 and the squeeze point 36. This distance, for example, may be on the order of 80 inches.

The rate of longitudinal travel of the metal in process together with the rate of heat generation in the metal are such that the two metal edges 21 reach a pressure welding temperature of approximately 2500° F. at or before the squeeze point 36. The speed of travel, then, depends on the rate of heat input and with an inductor design of given effectiveness may be varied by varying the length of the inductor or varying the number of inductors used in sequence. In the present example the inductor unit 25 may be on the order of a foot and a half in length to bring the metal to welding temperature at a satisfactory rate. The rate of travel of the metal may, for example, be as high as the surprising speed of 40 or more feet per minute with such an arrangement.

Close control in the continuous process may be achieved either by regulating the rate of heat output by the inductor unit 25 or by regulating the rate of travel of the cylindrical material governed by the drive motors 32, or a combination of both. In the preferred practice of the invention the cylindrical material is moved longitudinally through the apparatus at a constant rate and the desired close control of the temperature of the metal at the squeeze point is achieved by suitably varying the rate of heat output by the inductor unit 25.

Fig. 1 shows a heat sensitive device such as a bolometer, thermopile, photoelectric device or optical pyrometer, 40, that responds to the temperature radiation from the metal as the weld emerges from the hood 26. The heat sensitive bolometer 40 is connected by a cable 41 to a temperature control regulator 42 which in turn is connected with an exciter generator voltage control 43. The voltage control 43 regulates the main generator exciter unit 44 of a high frequency generator set 45, which generator set may have a frequency range, for example, from 3 to 10 kilocycles per second. The generator set 45 is connected by a pair of leads 47 with the primary side of an inductor transformer 48, the secondary side of the transformer being connected to the inductor unit 25 by a pair of leads 49. It can be readily understood how the optical pyrometer 40 in responding to temperature changes of the completed weld will control the energy output of the generator set 45 to maintain a constant welding temperature in the metal at the squeeze point 36.

In the more simple practices of the invention no further processing is required but a pair of forging rolls 50 may be employed, if desired, to flatten out the upset metal as the weld travels away from the inductor unit 25. In the preferred practice of the invention for welding relatively heavy pipe, however, additional means is provided for first chilling the finished weld and then reheating the metal. For this purpose Fig. 1 shows a spray unit 53 for spraying onto the metal water supplied through a pipe 54 and shows a second inductor unit 55 which may be termed the normalizing inductor unit since its function is to normalize the metal by reheating.

In the welding zone it is usually desirable to apply energy for heat generation from both sides of the metal, especially when the metal is relatively thick plate, and for this purpose certain duplicate parts along with the lower of the two forging rolls 50 will be mounted inside the traveling cylindrical material. Such duplicate parts may include, for example, a second inductor unit 25a, together with a hood 26a, positioned opposite the first mentioned inductor unit 25, a second transformer 48a, a second spray head 53a, and a second normalizing inductor unit 55a.

A feature of the preferred form of apparatus for carrying out the process is the concept of so mounting and supporting the above mentioned duplicate elements inside the traveling cylindrical material as to avoid interference at the receiving end of the apparatus, thus to make it possible to carry out the process in a continuous manner. For this purpose supporting structure, including a longitudinal hollow beam 58 inside the traveling cylinder, is attached to the splitter bar 22 and may be at least partially supported by the splitter bar. In the arrangement indicated in Fig. 1 the hollow beam 58 is securely anchored to the splitter bar 22 and braced by gussets 59. If desired the beam 58 may be braced and/or at least partially supported by one or more rollers riding on the inside of the traveling cylinder such as the roller 60 in Fig. 6. The various duplicate elements 25a, 26a, 28a, 48a, 53a, and 55a, as well as the lower of the two forging rolls 50, are suitably mounted on the beam 58 by means not shown. The various pipe and wiring connections with the inner elements are made through the tapered gap between the metal edges 21 as exemplified by the two bus bars 61 for supplying current from the motor generator set 45 to the inner transformer 48a for the inductor unit 25a.

*Temperature cycle*

In the more simple practices of the invention employing a single inductor unit and suitable means to bring the edges of the metal together with or without longitudinal travel of the metal, the temperature of the metal in the region of the two longitudinal edges 21 will simply rise to a peak for forming the weld and then will drop gradually as the metal is permitted to cool without any particular attention or post-weld treatment. In using the described apparatus, however, for continuously welding relatively heavy metal plate to form large diameter pipe, for example, ⅜ inch steel plate, the metal will go through a temperature cycle of the character indicated in Fig. 12.

Figure 12:
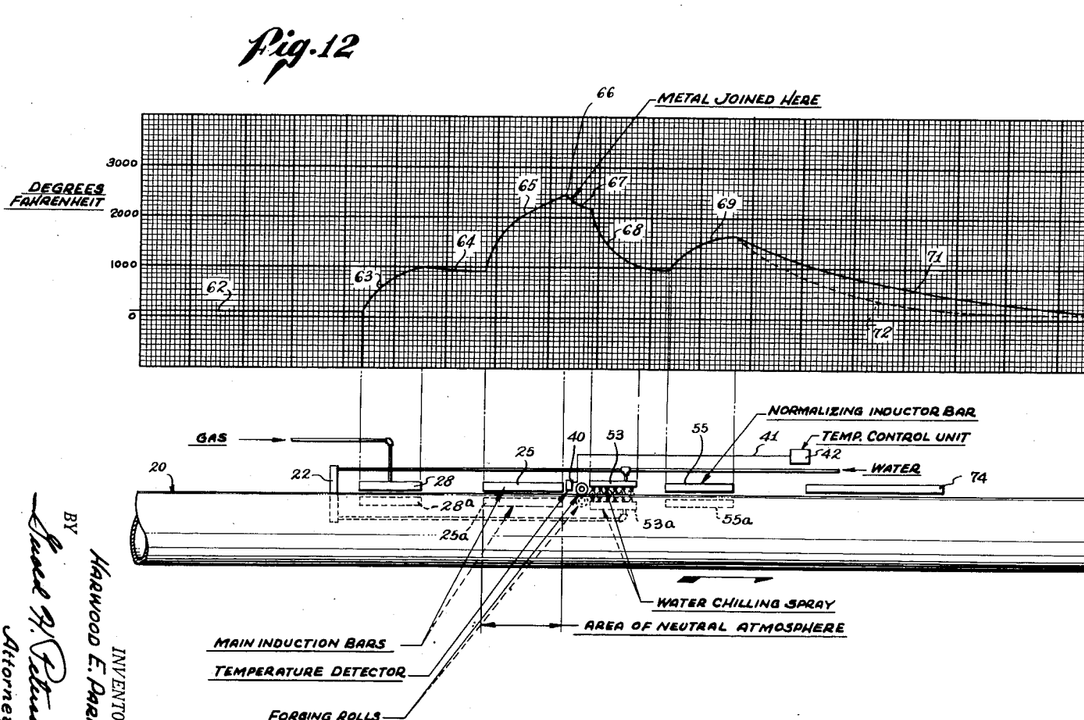
Fig. 12 is a diagrammatic view of the apparatus correlated with a chart showing the temperature cycle undergone by the metal in a preferred practice of the invention.

The initial portion 62 of the curve in Fig. 12 indicates the room temperature of the split metal cylinder as it enters the apparatus. The rising portion 63 of the temperature curve represents the effect of the pre-heating gas burner 28 which may, for example, bring the temperature of the metal to a level of the order of 1000° F., a temperature below the point at which scale forms on the metal. The traveling metal then cools slightly as indicated by the portion 64 of the curve and then climbs rapidly as indicated by the portion 65 of the curve as heat generation by the inductor unit 25 occurs.

The meeting of the two metal edges may occur anywhere in the region of the temperature peak 66, for example, just after the peak temperature is reached. After the peak 66 the temperature of the metal follows a natural cooling drop as indicated at 67 and then follows a sharper drop as indicated at 68 as the metal is chilled by the spray from the spray head 53. The metal is preferably permitted to drop to a temperature of the order of 900° F., the main purpose of this temperature drop being to prevent hot cracking. Then the metal reaches the normalizing inductor bar 55 for the final rise in temperature indicated at 69, which rise produces a normalizing effect on the welded metal. Thereafter the metal is permitted to cool to room temperature. In some instances it will be desirable to retard the rate at which this final cooling occurs by adding an elongated gas burner 74 to supply soaking heat for the purpose of prolonging the normalizing of the welded metal. The retarded rate of cooling is indicated by the portion 71 of the temperature curve. If retarding soaking heat is not supplied, the final drop in temperature will follow the lower temperature curve 72 shown in dotted lines in Fig. 12.

*Means to drive and contract the split metal cylinders*

Figure 8:
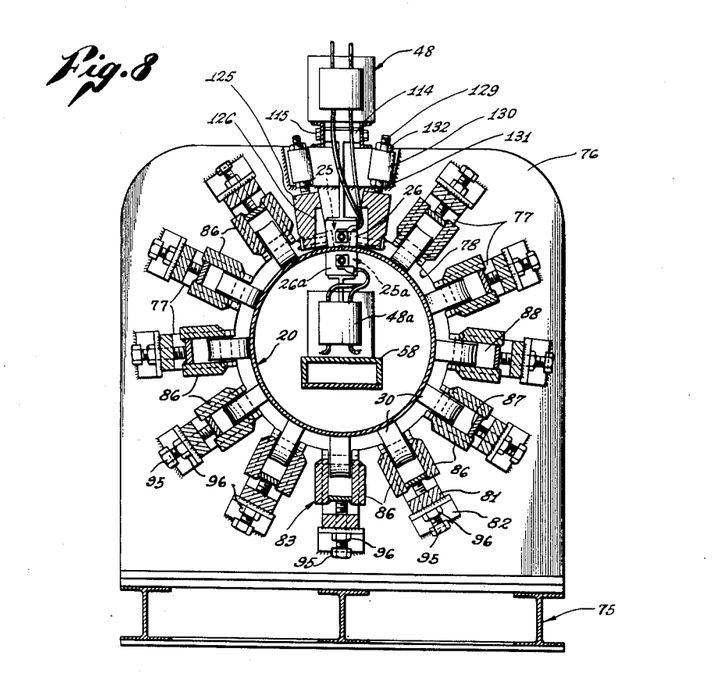
Fig. 8 is a transverse section taken as indicated by the line 8—8 of Fig. 6.

As best shown in Figs. 6 and 8, the apparatus for carrying out the process may be supported by a suitable frame having a base generally designated 75 comprising longitudinal and transverse I-beams welded together. The base 75 supports a number of upright longitudinally spaced transverse metal plates 76 that are relatively thick for strength and are formed with relatively wide radial slots 77 that open on a central circular opening 78 in each plate. Thus the frame is divided longitudinally into a number of sections, each section comprising two of the transverse plates 76 together with the inter-connecting frame structure. While there may be any number of such longitudinal sections, Fig. 6 shows only two sections—one frame section 79 that incorporates the inductor unit 25 and a frame section 80 that carries the traveling material to the inductor unit. The direction of travel is indicated by the arrow in Fig. 6.

The frame section 80, which typifies any number of frame sections leading up to the welding zone, includes a plurality of rigid longitudinal frame members in the form of heavy bars 81. Each of the longitudinal bars 81 is connected at its opposite ends to the transverse metal plates 76 near the outer or blind ends of the radial slots 77. An angular reinforcement 82 may be added at each end to strengthen the joint. Associated with each of the fixed bars 81 is a radial pressure member 83 on which is suitably journaled a longitudinal series of the previously mentioned pressure rolls 30.

In the construction shown each of the pressure members 83 comprises a pair of parallel plates 86 (Fig. 8) interconnected both by a longitudinal plate 87 and a series of transverse reinforcements 88. The radial pressure members 83 are mounted in the frame of the apparatus with a certain freedom for relative movement to permit adjustment of the various rolls 30 with respect to the traveling cylindrical material. For this purpose the opposite ends of the pressure members 83 slidingly extend into the radial slots 77 of the transverse metal plate and are loosely connected to the associated fixed longitudinal bars 81 by suitable rods 89.

As best shown in Fig. 6, each of the rods 89 extends through a suitable aperture in the corresponding fixed bar 81 and is threaded at its outer end to receive a nut 90. A washer 91 retained by the nut 90 holds a suitable helical spring 92 in compression aganst the fixed longitudinal bar 81.

The positions of the rolls 30 for gradual contraction of the traveling metal cylinder are adjusted by heavy pressure screws 95. These screws are threaded into each end of the fixed longitudinal bars 81 for abutment against the corresponding pressure members 83. The pressure screws 95 may be conveniently adjusted by a wrench as desired and may be releasably secured at positions of adjustment by suitable lock nuts 96.

On the upper side of the frame section 80 a pair of special pressure members 100 are spaced relatively close together on opposite sides of the longitudinal edges 21 of the traveling cylinder to hold the two edges in close alignment. Each of these two pressure members 100, which is similar in construction to the previously described pressure members 83, is slidingly confined at its opposite ends by a pair of guides 101 (Fig. 6) mounted on the face of the corresponding transverse metal plate 76.

For pressure adjustment each end of each pressure member 100 has rigidly mounted thereon an upwardly extending screw 102 that extends through a fixed bracket 103 mounted on the corresponding transverse plate 83 on the frame. A lower nut 104 abutting the bracket 103 transmits the reaction thrust of the screw to the bracket and a second upper nut 105 serves as a lock nut. As indicated in Fig. 6, each of the pressure members 100 may be provided with a bracket 106 into which is threaded a longitudinal screw 107 for abutment against the corresponding fixed bracket 103, the screw being provided with a suitable lock nut 108.

It is apparent from the described construction how the various pressure members 83 and 100 may be adjusted to progressively contract the traveling split cylinder as the cylinder moves from the previously mentioned splitter bar 22 towards the squeeze point where the heated metal edges are brought together.

The frame section 79 incorporating the inductor unit 25 is of similar construction having similar fixed longitudinal bars 81 and similar associated radial pressure members 83 as heretofore described. The structure at the top of the frame section 79 differs, however, because of the necessity for accommodating the inductor unit 25, the hood 26, and the upper forging roll 50.

As shown in Figs. 6 and 8, a pair of channel irons 112 extend across the top of the frame section 79 to serve as a support means. The previously mentioned transformer 48 may be mounted directly on the two channel irons 112 and the inductor unit 25 with its associated hood 26 may be carried by a downwardly extending webb 113 of a support casting 114 that is anchored to the two channel irons 112 by bolts and nuts 115.

As shown in Fig. 6, the upper forging roll 50 is journaled in a suitable carriage 117 that is slidingly mounted for vertical adjustment in a housing 118 on the underside of the two channel irons 112. For the purpose of adjusting the upper forging roll 50 downward, a suitable pressure screw 119 is mounted on a heavy cross bar 120. Inside the traveling metal cylinder the lower forging roll 50 is mounted in similar manner on the hollow beam 58, the pressure position of the lower roll being adjusted by a suitable screw 121 in the hollow beam. Fig. 6 shows the previously mentioned bracing roller 60 for the hollow beam positioned in the region of the lower forging roll 50 to transmit reaction pressure from the roll to the traveling cylinder and through the traveling cylinder to the outside pressure rolls 30 on the underside of the frame section 79.

To exert pressure on the traveling cylinder in the region of the longitudinal edges 21 as well as in the region of the finished weld beyond the point where the edges merge, the frame section 79 is provided with an upper pair of special pressure members 125 in the form of heavy bars that are cut away as indicated at 126 (Fig. 8) to clear the hood 26 around the inductor unit 25. Each of the two special pressure bars 125 carries a series of small diameter rolls 127 each of which is mounted on the inner end of a cross shaft 128. As shown in Fig. 8, the small rolls 127 are spaced close together in pairs on opposite sides of the line of weld and, as shown in Fig. 6, the rolls are positioned both along the path of approach to the inductor unit 25 and along the path from the inductor unit to the forging rolls 50. For adjustment each end of the special pressure members 125 has a rigid screw 129 that extends upward through a fixed bracket 130, there being a lower nut 131 to transmit reaction pressure to the bracket and an upper locking nut 132.

Construction of inductor unit

Figure 2:
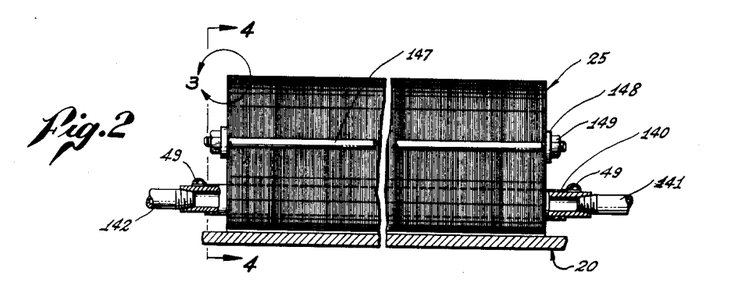
Fig. 2 is a view partly in side elevation and partly in section, showing a preferred form of inductor unit for use in the apparatus shown in Fig. 1.

The preferred form of the inductor unit 25, which is shown in detail in Figs. 2, 3, and 4, includes a hollow copper conductor 140 which is connected to the previously mentioned leads 49 for supplying high frequency current from the associated transformer 48. Distilled water for cooling the inductor unit is supplied to the interior of the hollow conductor 140 by a feed pipe 141 and is carried away by a pipe 142 at the other end of the conductor.

The high frequency current through the hollow conductor 140 creates high frequency fields of magnetic flux, the loops of magnetic flux tending to be concentric to the axis of the hollow conductor. As heretofore indicated, the inductor unit 25 includes a suitable laminated core structure to focus these loops of magnetic flux in a narrow longitudinal zone for the creation of high-energy eddy currents along the longitudinal edges 21 of the traveling metal cylinder.

As best shown in Fig. 4, the laminated core structure, which comprises a large number of exceedingly thin laminations 143, surrounds the hollow conductor 140 on three sides and forms two poles 144 which are directed toward the fourth side of the hollow conductor. The laminations 143 are eccentric with respect to the axis of the hollow conductor 140 so that the hollow conductor may be positioned relatively close to the traveling metal and the faces of the poles 144 conform in general to the surface of the traveling metal with relatively small clearance between the pole faces and the traveling metal.

The laminated core structure which embraces the hollow conductor 140 is insulated therefrom by suitable insulation 145 which may be mica. The laminations 143, which are separated by suitable layers of insulation 146 (Fig. 3), are held together by a pair of suitable tension rods 147 that extend through end bars 148 and are provided with suitable nuts 149 on their opposite ends.

The inductor unit 25 may be rigidly mounted on the previously mentioned upwardly extending support web 113 as heretofore described with reference to Figs. 6 and 8 to maintain fixed spacing between the pole faces and the traveling cylindrical metal. Closer control of the spacing between the pole faces and the traveling metal may be attained, however, by mounting the inductor unit 25 on the web 113 with a limited degree of freedom for relative movement up and down and providing the inductor units with longitudinal ceramic shoes 150 to slidingly rest upon the traveling metal and thus serve as accurate spacers for continually fixing the position of the inductor unit relative to the traveling metal.

With a temperature of the order of 2500° F. prevailing in the immediate region of the inductor unit, it is a problem to keep the laminated core structure from being heated to a destructive temperature. This problem is solved only in part by the circulation of cooling water through the hollow conductor 140, because even with such water circulation the temperature of the laminated structure is high enough to destroy a core assembly constructed in accord with usual practices. A feature of my invention is the provision of a laminated core structure that will withstand without damage higher temperatures than heretofore possible in such structures, thus making the present process practical for the concentrated generation of heat in the traveling material.

In accord with this feature of my invention, the individual laminations 143 are made of a high grade alloy, such as permalloy (a magnetic alloy of nickel 30–80% and iron) with the laminations exceedingly thin, say on the order of 0.005 inch thick. The laminations 143 are sheared or sheer die cut from grain oriented steel sheets with the grain of all the laminations running in the same direction from the back of the pole structure to the poles 144.

The insulation 146 spacing the laminations 143 apart is of suitable inorganic material such as silica, and is deposited on the laminations as an extremely thin film or coating. In the preferred process for coating the laminations 143, the laminations are placed in a colloidal suspension of insulating particles and an electrical potential is applied to cause the particles to be deposited as an insulating layer by cataphoresis. This method for applying an exceedingly thin and uniform film of insulating material is generally described in the article entitled "Magnetic Cores of Thin Tape Insulated by Cataphoresis" by H. L. B. Gould, in the publication "Electrical Engineering," for June 1950, pp. 544–548.

In this particular procedure, silicic acid in acetone was used and the laminations were completely coated with a layer of about one-tenth mil film of silicic acid particles, which is effective up to about 1000° F., the temperature at which the laminations were annealed. During this annealing heat treatment the silicic acid gives up its water of crystallization or hydration and becomes silicon dioxide, thus leaving a thin film of silicon dioxide or silica insulation. These thin coatings of silicon dioxide in the assembled core structure are effective to prevent welding between the laminations during annealing and also to prevent welding between the laminations in the course of actual service of the core structure for induction heating in accordance with my invention. It is contemplated that the laminations 143 will be coated individually, then assembled together with the tension rods 147 and end bars 148. The assembled core structure will then be dipped bodily in the silicic acid solution to form an over-all coat and then will be annealed.

In a typical practice of the invention, the hollow conductor 140 may be ⅝ inch square outside dimensions with a ⅛ inch wall forming a hollow space ⅜ inch square for water circulation. The inductor unit may be 18 inches long with each of the pole faces 0.85 inch wide. With a power input of 150 kva., a voltage across the hollow conductor 140 of 50 volts and a current of 3000 amperes (with a suitably connected power factor) at 3000 cycles per second alternating current, the two longitudinal edges of the traveling metal are heated to a pressure welding temperature of the order of 2500° F., while the metal edges travel at a speed of approximately 26 feet per minute. This speed is easily attained for welding metal plate ¼ inch thick and, with care in design and operation, higehr speeds are attainable with even thicker plate.

Figures 9, 10, 11:
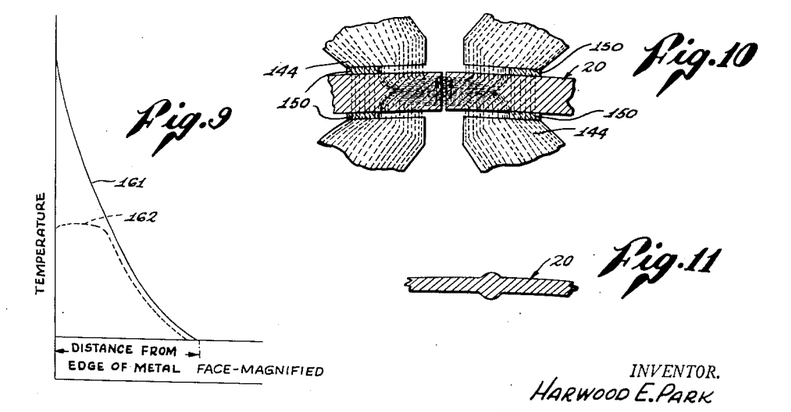
Fig. 9 is a diagram showing desirable temperature gradients that may be obtained in practicing the invention.
Fig. 10 is a fragmentary view similar to Fig. 4 showing certain space relationships that may be used to advantage in practicing the invention.
Fig. 11 is a cross-section of a weld produced by the invention.

The resulting weld is of such homogenous character with respect to the rest of the metal cylinder or pipe that microscopic examination of a cross-section of the weld, such as shown in Fig. 11, reveals no difference in metal structure at 60 diameters' magnification. A section of pipe welded by this process and subjected to destructive pressure in a hydraulic test, burst not at the welded seam but at a distance well away from the seam, thus clearly indicating that the weld was stronger than the parent metal.

How welding temperature is attained

As heretofore mentioned the concentration of an exceptionally high energy output in a narrow zone of metal to create the exceedingly rapid temperature rise is accomplished by taking advantage of a number of factors that work together to augment the heat-generating effect of eddy currents. These factors may be understood by referring to Figs. 4 and 5.

The alternating current in each of the hollow conductors 140 produces alternating fields of magnetic flux in which each field comprises a pattern of loops of magnetic flux or force surrounding the conductor. In a uniform medium the loops tend to take circular form concentric to the axis of the conductor. In a non-uniform medium as in the present situation where the loops must pass through both metal and air the loops seek paths of least energy or least resistance. Since the permeability of a ferromagnetic material may be several thousand times the permeability of air, the described ferromagnetic core structure around the conductor is highly effective for controlling the magnetic flux.

In Fig. 4 the two hollow conductors 140 are so connected to the source of alternating current that the current flows in opposite directions through the two conductors at any one instant of time. With the current flowing in opposite directions the fields of magnetic flux around the two conductors do not buck each other but, on the contrary, tend to link together. Under the conditions represented by Fig. 4 in which the two longitudinal edges 21 of the traveling metal cylinder 20 are spaced relatively far apart in comparison with the gaps between the traveling metal and the two sets of poles 144, the two fields of magnetic flux link together with the flux passing perpendicularly through the traveling metal plate as shown by dotted lines.

The combined fields of alternating flux set up eddy currents in the traveling metal and, of course, the general orientation of the eddy currents is perpendicular to the lines of magnetic force in the traveling metal. The two arrows in Fig. 4 may be taken as an attempt to represent end view of the patterns of eddy currents in the two pieces of metal at a given instant of time and the arrows forming elongated loops 160 in Fig. 5 may also be taken as an attempt to represent plan views of the eddy current patterns. The loops 160 are, of course, to be regarded as purely diagrammatic since the exact configuration of eddy current paths are not known. It is generally agreed however that the zones or regions of eddy current would have the general orientation indicated by the arrows in Figs. 4 and 5 under the stated conditions. The important point is, however, that the heating effect of the induced eddy currents is confined to the narrow zones as illustrated.

The first factor to be considered for augmenting the intensity of heating effect of the eddy currents in the regions indicated is the effect of the two core structures around the conductors 140 in focusing or concentrating the lines of magnetic flux in narrow zones longitudinally of the metal edges 21. It will be noted that the laminations 143 are convergent in configuration with respect to the two poles 144. It will also be noted that the laminations are eccentric with respect to the conductors 140 so that the laminations extend relatively great distances from the conductor in directions away from the welding zone whereby the laminations reach out so to speak to intercept an exceptionally large number of the loops of magnetic force.

Any of the hypothetical lines of force that are intercepted naturally follow the lines of least energy or least resistance afforded by the metal of the laminations and since the metal of the laminations converge in width toward the poles of the core structure the lines of force are correspondingly concentrated by the poles and thereby focused on the desired narrow heating zone of the traveling metal. It is a well recognized law that the heating effect of the eddy currents varies directly as the density of the magnetic flux so that the focusing effect of the core structure considered alone not only serves the function of restricting the zone to be heated but also greatly increases the heating effect of the eddy current per unit area within that zone.

A second factor utilized in the present process has a tremendous multiplying effect for attaining high magnitude heat generation in the traveling metal. This factor is the length of the paths afforded for the eddy currents in the metal in process. It has been found in studies of the phenomenon of eddy currents in laminations of core structures that the heating effect of the eddy currents varies as the square of the length of the eddy current path or loop. Even in the present core construction where the exceedingly thin laminations 143 offer exceedingly short eddy paths and thereby minimize the effects of the eddy currents the structure is heated somewhat by the eddy currents. In contrast, as may be seen in Figure 5, the traveling metal affords an exceedingly long path for eddy current flow, a path many thousand times the length of a path in a lamination 143, and since the heating effect varies as the square of the length of the path it can be readily appreciated that this factor alone accounts for tremendous power output in the generation of heat in the indicated welding zone.

The third factor utilized for augmenting the heating effect in the traveling metal is the frequency of the alternating current in the two conductors 140. Here again a relatively small increase in the factor has a relatively great effect since the heat generated by eddy current apparently varies with some function of the frequency. Using the preferred frequency range of 3 to 10 kilocycles per second has many times the effectiveness of ordinary 60 cycle current commonly used in resistance welding.

When it is considered that all three of these factors work together with the end result depending upon the combination of the factors it can be readily appreciated how the described process can raise the temperature of relatively thick sheet metal or plate at rates from two or three hundred degrees per second and higher.

Control of heat distribution

The present method of generating internal heat by eddy currents is highly flexible with respect to control over the pattern of heat distribution or temperature gradient and in the preferred practices of the invention such control is used to advantage for attaining high efficiency in welding. The heat distribution is governed in the first instance, of course, by the focusing effect of the core structure in restricting heat generation to the desired narrow longitudinal zone of the traveling metal, but within this zone further remarkably close control of the heat distribution is possible.

Since, theoretically, merger of only the surface molecules of the two opposed faces of metal along the longitudinal edges 21 is required to make a homogeneous weld of 100% efficiency, the ideal temperature gradient at the moment the two metal edges are brought into mutual pressure contact would be an exceedingly steep curve to peak temperature at the edge of each of the two pieces of metal. Such a temperature gradient is represented for example by the solid line curve 161 in Fig. 9, the curve representing temperature across the margin of one of the metal edges with the temperature peak at the edge face. In the preferred practice of the present invention for welding heavy pipe and the like, the temperature gradient along each longitudinal edge of metal is built up to the final pattern shown in Fig. 9 at the moment of metal to metal contact.

One of the factors utilized for control of heat distribution is the frequency of the alternating current in the two inductor units 25. It has been pointed out that increasing the frequency of the current increases the intensity or heating effect of the eddy currents in the traveling metal and, fortuitously, increasing the frequency of the current also increases the skin effect of the induced current and thereby affords a control over the depth of penetration of the induced eddy current as well as affording a desirable tendency for the current to seek the two surfaces of metal that are to be merged in the welding procedure. As more particularly pointed out below the effect of providing a relatively high concentration of heating current on the faces of the edges to be welded may be augmented by cleaning the faces just prior to welding.

An outstanding advantage of employing two conductors on opposite sides of the welding plane as shown in Fig. 4 is the introduction of another highly useful control principle that depends upon certain space relationships. Controlling the space or mode fundamentally these magnetic reluctance relationships make it possible to shift the heat distribution in a predetermined cycle to culminate in an optimum temperature gradient, such as shown in Fig. 9, at the moment the two metal surfaces meet in pressure contact.

To explain these space relationships reference is made to Fig. 4 where it can be seen that there are a number of air gaps to be taken in consideration for controlling the pattern of the magnetic flux. First there is what may be termed the pole gap of each of the core structures which is the distance between the two poles 144 of a core structure. Obviously if the path of least resistance for the lines of magnetic flux is across the pole gap, substantially no flux will penetrate the traveling metal and the purpose of the invention would be defeated. It is clear, then, that the pole gap of each of the core structures must be relatively wide to divert the magnetic flux to the material to be welded. Another space consideration is what may be termed the pole-to-metal gap which is the distance from the face of each pole 144 to the metal to be welded. A third space factor is what may be termed the metal-to-metal air gap which is the distance separating the two longitudinal metal edges 21 of the traveling cylinder.

In Fig. 4 the pole-to-metal air gaps and the metal-to-metal air gap are of such dimension that the flux path of least resistance is from one pole of one core structure through the traveling metal to the corresponding pole of the other core structure so that the flux travels through the traveling metal perpendicular to the surfaces of the metal. It is apparent that this pattern of flux distribution prevails when the metal-to-metal gap between the two metal edges 21 is greater than twice the pole-to-metal gap that separates each pole 144 from the traveling metal. On the other hand, when the metal-to-metal air gap is less than twice the pole-to-metal air gap at each of the four poles the lines of magnetic flux link one pole of each core structure through the traveling metal to the other pole of the same core structure as may be seen in Figure 10. In other words to obtain the desired effect shown in Fig. 10 the reluctance in the path from one pole through the metal-to-metal gap to the other pole of the same magnet must be less than the reluctance in the other path from one pole of one magnet through the metal to the pole of the opposite magnet. Also, under all conditions the reluctance between the two poles of each magnet must always be greater than the reluctance of any of these paths through the metal in order that the lines of flux do not short circuit from pole to pole.

It is highly significant for the purpose of the present invention that shifting the magnetic flux from the pattern shown in Fig. 4 to the pattern shown in Fig. 10 has two effects both of which favor increased heat generation close to the metal faces that are to be merged in the welding procedure. The first effect is the increase in the density of the magnetic flux in the region of the two opposed metal faces. The other efect is the change in the orientation of the eddy current from the horizontal orientation indicated by the arrows in Fig. 4 to the vertical orientation indicated by the arrows in Fig. 10. This second effect is important because the vertical orientation brings the eddy currents close to the two metal faces that are about to merge in mutual pressure contact.

Once these relationships are understood, the useful and highly flexible control of heat distribution that they make possible may be readily appreciated. For example, in the preferred practice of the invention it is contemplated that the flux pattern in the initial stage of heating the metal will be similar to the flux pattern shown in Fig. 4 and at a later stage, just before the two metal edges are brought into mutual pressure contact, the flux pattern will change to a pattern such as shown in Fig. 10. An important advantage of the cycle of heat distribution in the metal accomplished by such a shift in the magnetic flux pattern is found in the resulting progress or development of the temperature gradient across the metal as may be understood by referring to Fig. 9.

The initial pattern of flux distribution typified by Fig. 4 results in an initial temperature gradient of the character indicated by the dotted curve 162 in Fig. 9. This initial temperature gradient may be described as providing a temperature plateau extending inwardly from the edge of the metal, heat generation being more or less uniform across this plateau.. When the flux shifts to the pattern shown in Fig. 10, the temperature gradient is quickly built up from the values represented by curve 162 in Fig. 9 to the values represented by the solid line curve 161.

It can be appreciated that heat is generated in this final phase of the process in a manner and under conditions highly favorable for the end in view. The increased concentration of the flux at the metal edges and the reorientation of the eddy currents in close proximity to the metal edges have been mentioned. A third factor is that heat generated so close to the edge of a piece of metal can be dissipated by conduction only in one direction, the direction away from the metal edge. A fourth factor is that the initial heating to the temperature values represented by the dotted curve 162 retards the rate of conduction of heat away from the metal edge during the final stage of heat generation. This fourth factor may be understood when it is considered that the rate of heat flow varies directly as the rate of temperature drop along the path of flow and the early establishment of the temperature gradient represented by the dotted curve 162 greatly reduces the temperature drop prevailing in the final heating stage. Thus the two stage cycle of flux distribution represented by Figs. 4 and 10 result in the two stage temperature cycle represented by Fig. 9 culminating in the final optimum temperature gradient represented by the solid line curve 161.

Since the metal-to-metal air gap between the longitudinal edges 21 of the traveling metal is tapered as may be seen in Fig. 5, the metal-to-metal spacing automatically changes in the travel of the metal and it is possible to space the poles from the traveling metal at a uniform pole-to-metal spacing which will cause automatic shift from the flux pattern of Fig. 4 to the flux pattern of Fig. 10 as the two longitudinal edges of metal approach the squeeze point 36 in Fig. 5. For example, the gap between the metal edges 21 in Fig. 5 may taper from 0.45 inch at the near end of the heating zone to zero at the squeeze point 36 at the far end of the zone 18 inches away. At a uniform pole-to-metal spacing of approximately 0.11 inch as determined by the ceramic shoes 150, the shift in flux pattern will occur at approximately the mid point of the zone. Thus the point at which the shift occurs may be readily controlled.

While it has been assumed that the core structure associated with each of the hollow conductors 140 is substantially uniform in cross sectional configuration throughout its length and the pole faces are substantially uniformly spaced from the traveling metal throughout the length of the core structure, it is readily apparent that the core structure may be made non-uniform with respect to configuration throughout its length to vary the described space relationships for controlling the flux pattern in various ways for various specific purposes. Thus the pole gap or air distance between the two poles of a core structure may vary throughout the length of the structure to follow the narrowing metal-to-metal gap and the pole-to-metal spacing may also be varied throughout the length of the core structure to cause shift in the pattern of flux distribution. In this regard it may be pointed out that there is a certain advantage in tapering the pole gap of the core structure in accord with the taper of the metal-to-metal gap shown in Fig. 5.

As stated heretofore an inductor unit operating on only one side of the traveling metal is adequate for using this process to weld relatively thin metal, nevertheless the flexibility of control of heat distribution afforded by the combination of an outer inductor unit and an inner inductor unit is an important consideration in favor of using the dual arrangement on even relatively thin metal. It should be borne in mind however that the core structure of the lower inductor unit 25a can be used without the lower conductor and its associated lower transformer, since one upper conductor 140 in combination with an upper core structure and a lower core structure can be used to obtain the desirable flux patterns described above. Thus if the cylindrical material in process is too small in diameter to enclose a lower transformer, the lower transformer 48a and lower hollow conductor can be omitted without sacrificing flexibility of control.

Special preparation of metal surfaces

A further improvement in welding contemplated in the practice of the invention consists in adding special means to clean and prepare the surfaces that are to merge in the welding procedure. In general the problem is to remove all foreign material, oxides and scale, to achieve a bright virgin metal surface at the moment the two metal edges meet under pressure at the squeeze point as heretofore described.

A feature of this improvement is that it incorporates two provisions which taken together insure optimum results in the state of the metal surfaces at the final moment of merger. One of these provisions is to reduce to a minimum the time interval between the mechanical cleaning of the metal surfaces and the actual welding operation. This provision is accomplished by performing the metal cleaning step so close to the welding zone in the described continuous process that the newly cleaned surfaces are exposed to the surrounding atmosphere for a time interval as short as two or three seconds. The second provision is to provide further protection against oxidation or contamination in this relatively short period. This second provision is accomplished by including the cleaning means with the inductor unit inside the hood that confines the inert atmosphere so that the cleaning operation itself and the traveling of the metal from the cleaning means to the squeeze point both occur in the inert atmosphere.

Figure 13:
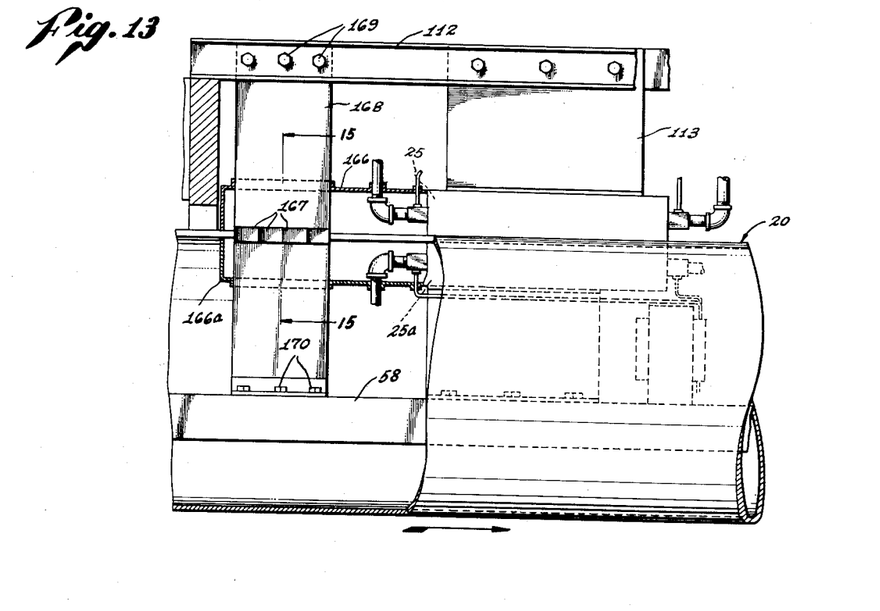
Fig. 13 is a longitudinal view partly in side elevation and partly in section showing a modification of the apparatus that includes means to clean the metal surfaces as they enter the welding zone.
Figure 14:
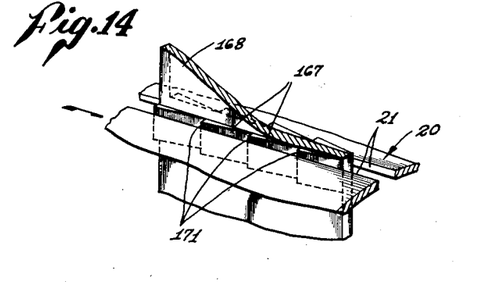
Fig. 14 is a fragmentary perspective view showing the metal cleaning means of Fig. 13.
Figure 15:
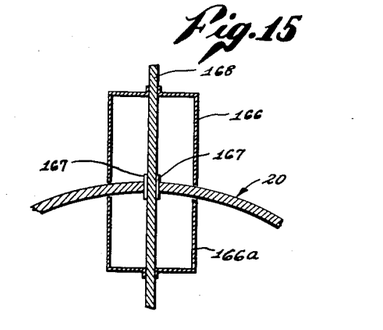
Fig. 15 is a fragmentary transverse section taken as indicated by the line 15—15 of Fig. 13.

In Figs. 13 to 15 embodying this improvement, many of the parts shown are similar or identical to parts heretofore described as indicated by the use of corresponding numerals to indicate corresponding parts. In this instance the hood 166 replaces the previously mentioned hood 26 to confine the inert gas and extends along the path of approach to the inductor unit 25 a sufficient distance to accommodate a suitable cleaning means. Preferably the cleaning means is in the form of a series of scraper elements or blades 167 but may be in other forms in various practices of the invention.

The hood 166 is shown supported by the previously mentioned web 113 and also by a second similar web 168 that is connected at its upper end by suitable bolts 169 to the previously mentioned longitudinal channel irons 112 and is connected at its lower end by suitable bolts 170 to the previously mentioned hollow beam 58. A similar hood 166a is mounted inside the traveling cylindrical material to encase the scraper elements 167 from below as well as to encase the lower inductor unit 25a.

The scraper elements 167 may be in the form of hardened steel blades having relatively sharp leading edges 171, as best shown in Fig. 14, directed toward the rear of the apparatus to meet the traveling material. The preferred material for the scraper blades is stellite, an alloy of steel with cobalt and 10–50% chromium and/or tungsten. It is contemplated that the scraper blades 167 will be movably and resiliently mounted with concealed yielding means continuously urging the separate scraper elements laterally outward against the longitudinal edges of the traveling metal.

There are two purposes for making the cleaning means laterally expansile in this manner. In the first place it is desirable to have the scraper elements exert suitable pressure against the metal to accomplish the cleaning function effectively. In the second place the taper of the air gap between the traveling edges of metal is determined, as heretofore described, by the previously mentioned splitter bar 22 and the action of the various pressure rolls 30 in bringing the metal together at the squeeze point. Employing cleaning means inside the hood 166 that is resilient in character avoids any interference with the tapered alignment of the metal edges.

Thus it will be seen that in accordance with this modification of my invention I have provided an arrangement whereby the faces of the edges which are to be butt welded are cleaned and maintained in the clean condition prior to and up to the point of actual contact to effect the weld. It is also a significant feature and discovery in accordance with my invention that not only does this provide clean faces for welding but also the clean faces provide a good electrical conducting surface having less resistance than the uncleaned upper and lower surfaces of the edges. The resulting effect of this is that more current passes, and more heating is concentrated, on the faces to be welded than upon the top and bottom surfaces of the edges. This further concentrates the heat at the faces to be welded where it is effective for heating just that part of the metal which should be heated to make the most effective weld. A still further advantageous provision in accordance with my invention to further concentrate more current on the faces than on the top and bottom portion of the edges, if desired, is to coat or otherwise apply to the tops and bottom surfaces of the edges up to the faces a coating material which has a high resistance and which reduces the flow of current on these upper and lower surfaces. However, the mill scale which is ordinarily on sheet steel will usually provide a sufficiently high resistance surface coating so that the effect here referred to in accordance with my invention may be obtained to the desired degree only by the clean faces. With metals which do not have such a high resistance coating there will be, as here pointed out, a significant advantage in coating the upper and lower faces of the edges to be welded with a coating of high electrical resistance to direct the heating current to the faces to be welded.

Although the invention has been described as applied to the continuous welding of metal to form pipe it is quite apparent that the same principles can be utilized in non-continuous welding where two pieces of metal are moved toward each other without longitudinal travel.

It is also to be understood that various changes modifications and other departures from my specific disclosure may be made by those skilled in the art within the scope and spirit of the invention as defined in the appended claims.

Having described my invention, I claim:

1. A method of butt-welding two sheets of metal characterized by the use of two parallel oppositely connected inductors positioned substantially parallel to each other on opposite sides of a work plane, each of said inductors being surrounded on three sides away from said plane by a laminated core structure having poles directed toward said plane, said method including the steps of: placing said two plates edge to edge in said plane parallel with said inductors with an air gap between the two plates less than the pole gaps of said cores but greater than the sum of the two air gaps between the plates and the poles on one side of said plane whereby the magnetic flux surrounding said inductor links the two poles of the cores on each side of the air gap with the flux extending through the two plates approximately perpendicularly thereto to create eddy currents in the two plates adjacent the plate edges and parallel thereto; moving said plates relative to each other to reduce said air gap between the two plates to less than the sum of the air gaps between the poles and the plates on one side of said plane whereby said flux shifts to link each pair of said poles through the plates and across the air gap between the two plates with corresponding shift of the eddy currents toward the edges of the plates; and then pressing said edges together when they are at welding temperature.

2. A method of butt-welding two sheets of metal characterized by the use of two parallel oppositely connected inductors positioned substantially parallel to each other on opposite sides of a work plane to create a heating zone in said plane, each of said inductors being surrounded on three sides away from said plane by a laminated core structure having poles directed toward said plane, said method including the steps of: placing said two plates in said work plane with the plates edge to edge forming a tapered air gap between the plates substantially in longitudinal alignment with the two inductors; and moving said plates in said plane progressively through said heating zone longitudinally thereof; simultaneously moving said plates toward each other to keep the edges of the plate meeting in the region of the far end of said zone; and keeping the air gap between the two plates at the near end of said zone less than the pole gaps of said cores but greater than the sum of the two air gaps between the poles and the plates on one side of said plane whereby initially the magnetic flux surrounding said inductors link the two poles of the cores on each side of the air gap with the flux passing through the two plates approximately perpendicular thereto to create eddy currents in the two plates adjacent the plate edges and parallel thereto, and whereby the converging of the two metal edges in said zone reduces said air gap between the two plates to less than the sum of the air gaps between the poles and the plates on one side of said plane to cause said flux to shift to link each pair of said poles through the plates and across the air gap between the two plates with corresponding shift of the eddy currents toward the edges of the plates.

3. A method of butt-welding two pieces of sheet steel including the steps of: preheating the marginal portions of said sheets to a temperature on the order of 1,000° F.; positioning the two sheets with said margins edge to edge; after said preheating conducting high frequency alternating current only, with respect to said two pieces of sheet steel, adjacent to and substantially parallel to said edges thereby producing loops of magnetic flux linked with both pieces of metal to produce heat generating eddy currents only in and parallel to the edges of the two pieces of metal; providing numerous insulated metal paths converging in the region of the edges of said sheets thereby to heat only the edges of the sheets to a temperature on the order of 2500° F. without heating any other of said sheets by induction; and pressing the two edges of the sheets together while at welding temperature.

4. A method of fabricating pipe from sheet metal characterized by the use of two parallel oppositely connected inductors cooperating to form a heating zone therebetween parallel thereto, each of said inductors being surrounded on three sides away from said heating zone by a laminated core structure having a pair of poles directed toward the heating zone, said method including the steps of: forming said sheet metal into a longitudinally split cylinder; moving said cylinder longitudinally to carry its longitudinal edges through said heating zone longitudinally thereof; holding said edges apart as they approach the heating zone and thereafter crowding the edges toward each other to align the edges convergently to meet and weld together in the region of the far end of the heating zone; and maintaining the convergent alignment of said edges to provide an air gap between the edges in the initial portion of said zone less than the pole gaps of said core structures but greater than the sum of the two air gaps between the poles and plates on one side of said plane whereby the magnetic flux surrounding said inductors links the two poles of the core structures on each side of the air gap with the flux passing through the two plates approximately perpendicularly thereof to create eddy currents in the two plates adjacent the plates edges and parallel thereto, and whereby the air gap between the converging edges of the plates narrows to less than the sum of the air gaps between the poles and the plates on one side of said plane whereby the magnetic flux shifts in pattern to link each pair of said poles through the plates and across the air gap between the two plates with corresponding shift of the eddy currents toward the edges of the plates as the converging plates approach the point at which they meet and weld together.

5. A method of fabricating pipe from sheet steel as set forth in claim 4 which includes the step of preheating the metal adjacent said split edges to a temperature on the order of 1000° F. before the metal edges reach said heating zone.

6. A method of fabricating pipe from sheet steel as set forth in claim 4 which includes the steps of chilling the welded metal to a temperature on the order of 1000° F. as the metal moves away from said heating zone and then normalizing the metal by reheating it to a temperature on the order of 1600° F.

7. In an induction heating apparatus for butt-welding two pieces of metal positioned edge to edge in a welding zone, the combination of: a pair of inductors extending parallel with the edges of said pieces of metal adjacent said zone longitudinally thereof on opposite sides of the plane of the zone; means to energize said inductors in opposite respects with high frequency alternating current thereby to create alternating loops of magnetic flux around the two inductors and thereby inducing eddy currents in said edges parallel thereto; and a laminated ferromagnetic means extending around three sides of each of said inductors away from said welding zone with a pair of poles directed toward said zone on the fourth side of the inductor.

8. An induction heating apparatus as set forth in claim 7 in which the radial dimension of each of said laminated ferromagnetic means with respect to the axis of the corresponding inductor is relatively large in a direction away from said welding zone to intercept a relatively large number of said loops and is relatively small in the region of said poles to concentrate the loops in a relatively narrow welding zone.

9. In an induction heating apparatus for butt-welding two pieces of metal positioned edge to edge in a welding zone, the combination of: a pair of inductors extending parallel with the edges of said pieces of metal adjacent said zone longitudinally thereof on opposite sides of the plane of the zone; means to energize said inductors in opposite respects with high frequency current thereby to create alternating loops of magnetic flux around the two inductors and thereby inducing eddy currents in said edges parallel thereto; and laminated ferromagnetic means extending around three sides of each of said inductors away from said welding zone with a pair of poles directed toward said zone on the fourth side of each inductor; and means to move the two pieces of metal together in said welding zone in a predetermined cycle in which cycle the initial gap between the two metal edges is greater than the sum of the two gaps between the metal and the two poles on one side of said plane whereby said two ferromagnetic means are interlinked by magnetic flux through the edge portions of the two pieces of metal and later in the cycle the gap between the two metal edges is less than the sum of the two gaps between the metal and the two poles on one side of said plane whereby the two poles of each of said ferromagnetic means are interlinked by flux through the edge portions of the two pieces of metal and across the gap between the two pieces of metal.

10. An induction heating apparatus as set forth in claim 9 in which said moving means moves the two pieces of metal progressively longitudinally of said zone in convergent alignment to progressively lessen the gap between the two pieces of metal in the welding zone thereby to carry out said cycle in the welding zone.

11. In an induction heating apparatus for butt-welding the longitudinal edges of longitudinally split cylinders of sheet metal to form pipe, the combination of: means to move said cylinder longitudinally through a longitudinal heating zone; means to position said two edges convergently to form a tapered gap with the two edges meeting in pressure contact near the far end of said heating zone; an outer inductor positioned parallel to said edges and outside said pipe adjacent said heating zone longitudinally thereof; an inner inductor positioned parallel to said edges and inside said pipe adjacent said heating zone longitudinally thereof; means to energize said two inductors in opposite respect with high frequency alternating current thereby to create alternating loops of magnetic flux around the two inductors and thereby inducing eddy currents in said edges parallel thereto; laminated ferromagnetic means extending around each of said inductors on three sides of the inductor away from said heating zone with a pair of poles directed toward said zone on the fourth side of the inductor, the gap between the poles of each of said ferromagnetic means being greater than the sum of said tapered gap in the heating zone and the gaps between the individual poles and the metal in the heating zone to cause said flux loops to link with said longitudinal edges.

12. An induction heating apparatus as set forth in claim 11 in which the means to energize said inner inductor extends through said tapered gap.

13. An induction heating apparatus as set forth in claim 11 which includes means extending through said tapered gap both to energize the inner inductor and to at least partially support the inner inductor.

14. An induction heating apparatus as set forth in claim 11 which includes means extending through said tapered gap to energize the inner inductor and which includes means adapted to rest on the inside of the traveling cylinder to at least partially support said inner inductor.

15. An induction heating apparatus as set forth in claim 11 in which at the near end of said zone the width of the tapered gap is greater than the sum of the gaps between the metal and a pair of said poles whereby said loops of magnetic flux link the two poles on each side of the tapered gap through the metal, the tapered gap at a more advanced point in the heating zone being less than said sum whereby the magnetic flux shifts to link each pair of said poles through said longitudinal edges.

16. An induction heating apparatus as set forth in claim 11 which includes means to preheat the longitudinal edges of the cylinder to a temperature on the order of 1000° F. before the longitudinal edges reach said heating zone.

17. An induction heating apparatus as set forth in claim 11 which includes means to chill the welded metal after the metal leaves said heating zone to a temperature on the order of 1000° F. and includes normalizing means to reheat the metal to a temperature on the order of 1600° F.

18. A method of butt-welding two pieces of sheet steel including the steps of: preheating the marginal portions of said sheets to a temperature on the order of 1,000° F.; positioning the two sheets with said margins edge to edge; conducting high frequency alternating current adjacent to and substantially parallel to said edges thereby producing loops of magnetic flux linked with both pieces of metal to produce heat generating eddy currents in the two pieces of metal; providing numerous insulated metal paths converging in the region of the edges of said sheets thereby to heat the edges of the sheets to a temperature on the order of 2500° F.; pressing the two edges of the sheets together while at welding temperature; chilling the metal in the region of the weld to a temperature on the order of 1000° F. and then normalizing the metal by reheating to a temperature on the order of 1600° F.

19. A method of butt-welding as set forth in claim 18 which includes the additional step of permitting the reheated metal to cool with application of heat to retard the cooling rate.

20. A method of fabricating pipe from sheet metal including the steps of: forming said sheet metal into a longitudinally split cylinder; moving said cylinder longitudinally to carry the longitudinal edges through a heating zone; conducting a high frequency current in a path substantially parallel to and adjacent to said longitudinal edges in said heating zone thereby producing loops of magnetic flux linked with the metal of the cylinder; providing insulated metal paths around said conducting path converging in the region of said edges whereby high intensity eddy currents heat said edges to welding temperature in said zone; holding said edges apart as they approach the heating zone and crowding the edges together in the region of the heating zone thereby to align the edges to converge and weld together continuously in the region of the far end of said heating zone; chilling the welded metal to a temperature on the order of 1000° F. as the metal moves away from said heating zone and then normalizing the metal by reheating the metal to a temperature on the order of 1600° F.

21. A method of fabricating pipe from sheet metal characterized by the use of two parallel oppositely connected inductors cooperating to form a heating zone therebetween parallel thereto, each of said inductors being surrounded on three sides away from said heating zone by a laminated core structure having a pair of poles directed toward the heating zone, said method including the steps of: forming said sheet metal into a longitudinally split cylinder; moving said cylinder longitudinally to carry its longitudinal edges through said heating zone longitudinally thereof; holding said edges apart as they approach the heating zone and thereafter crowding the edges toward each other to align the edges convergently to meet and weld together in the region of the far end of the heating zone; and maintaining the convergent alignment of said edges to provide an air gap between the edges in the initial portion of said zone less than the pole gaps of said core structures but greater than the sum of the two air gaps between the poles and plates on one side of said plane whereby the magnetic flux surrounding said inductors links the two poles of the core structures on each side of the air gap with the flux passing through the two plates approximately perpendicularly thereto to create eddy currents in the two plates adjacent the plates edges, and whereby the air gap between the converging edges of the plates narrows to less than the sum of the air gaps between the poles and the plates on one side of said plane whereby the magnetic flux shifts in pattern to link each pair of said poles through the plates and across the air gap between the two plates with corresponding shift of the eddy currents toward the edges of the plates as the converging plates approach the point at which they meet and weld together; chilling the welded metal to a temperature on the order of 1000° F. as the metal moves away from said heating zone and then normalizing the metal by reheating it to a temperature on the order of 1600° F.

22. In an induction heating apparatus for butt-welding the longitudinal edges of longitudinally split cylinders of sheet metal to form pipe, the combination of: means to move said cylinder longitudinally past a splitting station and through a heating zone in sequence; means at said splitting station to hold said two edges at a predetermined spacing from each other; means beyond said splitting station to compress said cylinder laterally to force said edges together under pressure in the region of said heating zone thereby forming a tapered gap between the two edges as they approach the heating zone; an inductor extending adjacent to said zone longitudinally thereof; means to energize said inductor with high frequency current thereby to create alternating loops of magnetic flux around the inductor; laminated ferromagnetic means extending around three sides of said inductor away from said welding zone with a pair of poles directed toward said zone on the fourth side of the inductor, the gap between said poles being substantially greater than the sum of the gaps between the individual poles in said zone to cause said flux loops to link with the edge portions of the cylinder thereby to create eddy currents in the metal adjacent said edge portions; means to chill the welded metal after the metal leaves said welding zone to a temperature on the order of 1000° F. and normalizing means to reheat the metal to a temperature on the order of 1600° F.

23. In an induction heating apparatus for butt-welding the longitudinal edges of longitudinally split cylinders of sheet metal to form pipe, the combination of: means to move said cylinder longitudinally through a longitudinal heating zone; means to position said two edges convergently to form a tapered gap with the two edges meeting in pressure contact near the far end of said heating zone; an outer inductor positioned outside said pipe adjacent said heating zone longitudinally thereof; an inner inductor positioned inside said pipe adjacent said heating zone longitudinally thereof; means to energize said two inductors in opposite respect with high frequency alternating current thereby to create alternating loops of magnetic flux around the two inductors; laminated ferromagnetic means extending around each of said inductors on three sides of the inductor away from said heating zone with a pair of poles directed toward said zone on the fourth side of the inductor, the gap between the poles of each of said ferromagnetic means being greater than the sum of said tapered gap in the heating zone and the gaps between the individual poles and the metal in the heating zone to cause said flux loops to link with said longitudinal edges; means to chill the welded metal after the metal leaves said heating zone to a temperature on the order of 1000° F. and normalizing means to reheat the metal to a temperature on the order of 1600° F.

24. In an induction heating apparatus for butt-welding two pieces of metal positioned edge to edge in a welding zone, the combination of: an inductor extending parallel to the adjacent edges of said pieces of metal adjacent said zone longitudinally thereof; means to energize said inductor with high frequency current thereby to create alternating loops of magnetic flux about the inductor and thereby inducing eddy currents in said edges parallel thereto; and laminated ferromagnetic means extending around three sides of said inductor away from said welding zone with a pair of poles directed toward said zone on the fourth side of the inductor, the gap between said poles being substantially greater than the sum of the gaps between the individual poles and metal in said zone to cause said flux loops to link with the edge portions of the two pieces of metal in the zone thereby to create eddy currents in said edge portions, said ferromagnetic means comprising an assembly of magnetic alloy sheets separated by high temperature resistant insulation and in which said sheets have grains all oriented in the same direction and in which said sheets are insulated from each other by silicon dioxide.

25. In an induction heating apparatus for butt-welding two pieces of metal positioned edge to edge in a welding zone, the combination of: an inductor extending parallel to the adjacent edges of said pieces of metal adjacent said zone longitudinally thereof; means to energize said inductor with high frequency current thereby to create alternating loops of magnetic flux about the inductor and thereby inducing eddy currents in said edges parallel thereto; and laminated ferromagnetic means extending around three sides of said inductor away from said welding zone with a pair of poles directed toward said zone on the fourth side of the inductor, the gap between said poles being substantially greater than the sum of the gaps between the individual poles and metal in said zone to cause said flux loops to link with the edge portions of the two pieces of metal in the zone thereby to create eddy currents in said edge portions, said ferromagnetic means comprising an assembly of thin sheets of permalloy separated by silica insulation.

26. In the method of manufacturing large diameter pipe from relatively thick sheet steel in which the sheet steel is formed into a cylinder and the edges welded together by heating the edges to welding temperature and pressing the heated edges together to effect the weld, the improvement which comprises heating the edges to welding temperature by directing concentrated high frequency alternating magnetic flux into and from both the upper and lower sides of each of said edges to thereby induce high frequency currents in, parallel to, and substantially at the face of said edges to heat said edges to welding temperature and thus to heat both the upper and lower portions of the edges to produce a satisfactory weld at both the upper and lower portions of the welded interface.

27. A method of butt-welding two pieces of sheet steel including the steps of: preheating the marginal portions of said sheets to a temperature on the order of 1000° F.; positioning the two sheets with said margins edge to edge; after said preheating conducting high frequency alternating current only, with respect to said two pieces of sheet steel adjacent to and substantially parallel to said edges thereby producing loops of magnetic flux linked with both pieces of metal to produce heat generating eddy currents only in and parallel to the edges of the two pieces of metal; providing numerous insulated metal paths converging in the region of the edges of said sheets thereby to heat only the edges of the sheets to a temperature on the order of 2500° F. without heating any other of said sheets by induction; and pressing the two edges of the sheets together while at welding temperature, chilling the metal in the region of the weld to a temperature on the order of 1000° F. and then normalizing the metal by reheating to a temperature on the order of 1600° F.

28. A method of butt-welding as set forth in claim 27 which includes the additional step of permitting the reheated metal to cool with application of heat to retard the cooling rate.

29. A method of fabricating pipe from sheet metal including the steps of: forming said sheet metal into a longitudinally split cylinder; moving said cylinder longitudinally to carry the longitudinal edges through a heating zone; conducting a high frequency current only in a path substantially parallel to and adjacent to and substantially equidistant from each of said longitudinal edges in said heating zone thereby producing loops of magnetic flux linked with the metal of the cylinder; providing insulated metal paths around said conducting path converging in the region of said edges whereby high intensity eddy currents or induced in and parallel to the edges to heat said edges to welding temperature in said zone without heating any other portion of said metal by induction; holding said edges apart as they approach the heating zone thereby to align the edges to converge and weld together continuously in the region of the far end of said heating zone, chilling the welded metal to a temperature on the order of 1000° F. as the metal moves away from said heating zone and then normalizing the metal by reheating the metal to a temperature on the order of 1600° F.

30. In an induction heating apparatus for butt-welding two pieces of metal positioned edge to edge in a welding zone the combination of: an inductor extending only parallel to the adjacent edges of said pieces of metal adjacent said zone longitudinally thereof and extending only substantially equidistant from said edges; means comprising leads connected to each end of said inductor and a single conductor for high frequency current substantially equidistant from said edges to energize said inductor with high frequency current thereby to create alternating loops of magnetic flux about the inductor and thereby inducing eddy currents in said edges parallel thereto; and laminated ferromagnetic means extending around three sides of said inductor away from said welding zone with a pair of poles directed toward said zone on the fourth side of the inductor, the gap between said poles being substantially greater than the sum of the gaps between the individual poles and metal in said zone to cause said flux loops to link with the edge portions of the two pieces of metal in the zone thereby to create eddy currents in said edge portions, said ferromagnetic means comprising an assembly of magnetic alloy sheets having grains all oriented in the same direction and separated and insulated from each other by high temperature resistant silicon dioxide insulation.

31. An induction heating apparatus as set forth in claim 30 in which said magnetic alloy sheets of permalloy sheets coated with silica insulation applied by cataphoresis in silicic acid in acetone.

32. In an induction heating apparatus for butt-welding the longitudinal edges of longitudinally split cylinders of sheet metal to form pipe, the combination of: means to move said cylinder longitudinally past a splitting station and through a heating zone in sequence; means at said splitting station to hold said two edges at a predetermined spacing from each other; means beyond said splitting station to compress said cylinder laterally to force said edges together under pressure in the region of said heating zone thereby forming a tapered gap between the two edges as they approach the heating zone; an inductor extending parallel to said edges and adjacent to said zone longitudinally thereof; means comprising leads connected to each end of said inductor and a single conductor for high frequency current substantially equidistant from said edges to energize said inductor with high frequency current thereby to create alternating loops of magnetic flux around the inductor; laminated ferromagnetic means extending around three sides of said inductor away from said welding zone with a pair of poles directed toward said zone on the fourth side of the inductor, the gap between said poles being substantially greater than the sum of the gaps between the individual poles in said zone to cause said flux loops to link with the edge portions of the cylinder thereby to create eddy currents only in the metal adjacent said edge portions; means to chill the welded metal after the metal leaves said welding zone to a temperature on the order of 1000° F. and normalizing means to reheat the metal to a temperature on the order of 1600° F.

33. In an induction heating apparatus for butt-welding two pieces of metal positioned edge to edge in a welding zone, the combination of: an inductor extending parallel to the adjacent edges of said pieces of metal adjacent said zone longitudinally thereof; means to energize said inductor with high frequency current thereby to create alternating loops of magnetic flux about the inductor and thereby inducing eddy currents in said edges parallel thereto; and laminated ferromagnetic means extending around three sides of said inductor away from said welding zone with a pair of poles directed toward said zone on the fourth side of the inductor, the gap between said poles being substantially greater than the sum of the gaps between the individual poles and metal in said zone to cause said flux loops to link with the edge portions of the two pieces of metal in the zone thereby to create eddy currents in said edge portions, said ferromagnetic means comprising an assembly of thin sheets of permalloy separated by silica insulation, said permalloy sheets having the grains all oriented in the same direction and coated with silica insulation applied by cataphoresis in silicic acid in acetone.

34. The method of welding pieces of metal at facing edges forming a seam which comprises heating the edges to welding temperature by inducing an electrical current within the metal substantially only at the edges of the seam by applying a high-frequency magnetic flux to the metal of said edges and across the faces thereof by means of a conductor arranged substantially parallel and adjacent to said edges and spaced from said edges and from the space between said edges and concentrating the high-frequency magnetic flux about said conductor within the metal of said edges by means of a laminated horseshoe core extending around said conductor including a portion of the space between said conductor and said pieces of metal and excepting a space between said edges and said conductor, said horseshoe core having two spaced feet extending toward said pieces of metal with one foot on each side of said edges and with the space between said feet greater than the space between said pieces of metal and said feet, so that magnetic flux about said conductor is thus directed into the metal pieces adjacent to and across said edges, and contacting the heated edges to effect the welding.

35. The method as defined in claim 34 in which said flux is concentrated by means of a laminated core extending about and embracing the high-frequency conductor.

36. The method as defined in claim 34 in which said high-frequency magnetic flux is so concentrated within the metal of said edges so that substantially all of said flux is concentrated within a narrow band at said edges.

37. In an induction heating unit for heating the edges of the seam of metal to be welded, an elongated conductor for carrying high-frequency current, means comprising a horseshoe yoke of laminae separated by silica insulation embracing and extending along said conductor for directing and concentrating magnetic flux present about said conductor when carrying the high-frequency current, along a narrow zone extending along said conductor and adapted to substantially coincide with a portion of the seam to be welded and to direct magnetic flux in a narrow band of the edges to be welded when placed adjacent thereto with said conductor parallel with said seam.

38. An electrical induction heating unit for heating the edges of the seam of metal to be welded comprising an elongated conductor for carrying high-frequency current, a pole shoe extending along and embracing said conductor for concentrating high-frequency magnetic flux within a narrow band along said conductor, said pole shoe being substantially horseshoe-like in configuration in cross-section and comprising an assembly of magnetic alloy sheets separated by insulation capable of withstanding a high temperature of about 1000° C.

39. A heating unit as defined in claim 38 in which said sheets are thin sheets of permalloy separated by silica insulation.

40. A heating unit as defined in claim 39 in which said silica insulation is deposited on said sheets by cataphoresis in silicic acid in acetone followed by annealing at a temperature sufficiently high to effect silica deposition.

41. A heating unit as defined in claim 38 in which said magnetic alloy sheets have grains all orientated in the same direction.

42. A laminated core substantially horseshoe-like in configuration in cross-section adapted to almost but not entirely embrace a conductor comprising a compact assembly of magnetic alloy sheets coated with an insulation material capable of withstanding high temperatures.

43. A laminated core as defined in claim 42 in which said coating is a thin film of silicon dioxide.

44. The method of welding the edges of a pipe formed from steel plate which comprises heating substantially only a narrow band of metal within said edges to welding temperature by electrical induction heating with the magnetic flux directed into and across the faces of the edges by means of a horseshoe core extending about a high frequency conductor with the feet of said horseshoe core placed on opposite sides of said edges and closer to said pipe than the spacing between said feet and the spacing between said feet less than the width of said conductor, and when the metal of the edges has reached the desired temperature for welding pressing said edges together to effect the desired weld.

45. The method of welding facing pieces of material which comprises arranging the pieces of said material with portions having surfaces facing one another with a relatively small space therebetween, applying a high frequency magnetic flux to a relatively narrow depth of the material below said surfaces with said magnetic flux extending across said surfaces by means of a horseshoe core extending about a high frequency conductor with the feet of said horseshoe core placed on opposite sides of said surfaces and closer to said pieces of metal than the spacing between said feet and the spacing between said feet less than the width of said conductor, moving said surfaces together to effect contact thereof, while maintaining the application of high frequency magnetic flux across said surfaces, and thereby heating the material at said surfaces to welding temperature and effecting said weld.

46. The method of welding facing surfaces of material which comprises arranging said surfaces to face one another with a relatively small space therebetween, electrically inducing heating current within a narrow band of depth at each of said facing surfaces with the induced current in each of said narrow bands parallel to the surface of the band and with the highest current density near the surface by applying a high frequency magnetic flux to said band with said flux extending across said facing surfaces by means of a horseshoe core extending about a high frequency conductor with the feet of said horseshoe core placed on opposite sides of said surfaces and closer to said pieces of metal than the spacing between said feet and the spacing between said feet less than the width of said conductor, to thereby produce said current and heat the material at said surfaces to welding temperature, and, while said magnetic flux is applied, gradually bringing said surfaces into contact to effect the weld between said surfaces.

47. In the method of making cylindrical steel pipe from sheets of steel in which the sheets of steel are progressively along the length thereof, bent into cylinders with facing edges forming a seam and the edges of the seam heated, contacted by pressing, and welded together progressively along the seam to form the welded pipe, the improvement for effecting welding of the edges of the seam which comprises passing a high frequency electric current parallel and close to said seam so that high frequency magnetic flux resulting from said current extends into the edges of said seam across the faces of the edges and along the length thereof over the zone of contacting of said edges and a distance prior thereto, concentrating and directing high frequency magnetic flux surrounding said current into the edges of said seam and across the faces thereof along said length by means of a horseshoe core extending about a high frequency conductor with the feet of said horseshoe core placed on opposite sides of said edges and closer to said pipe than the spacing between said feet and the spacing between said feet less than the width of said conductor, to induce a heating current within the edges to heat the edges to welding temperature before contact, and relatively moving said edges and said current along said seam with the progressive contacting of said edges, and thereby heating substantially only the edges of said seam to welding temperature prior to and during contact to effect said weld.

48. The method as defined in claim 47 in which such a high frequency current as defined is applied both above and below the edges of said seam.

49. In the method of making cylindrical steel pipe from sheets of steel in which the sheets of steel are progressively, along the length thereof, bent into cylinders with facing edges forming a seam and the edges of the seam heated, contacted by pressing, and welded together progressively along the seam to form the welded pipe, the improvement for effecting welding of the edges of the seam which comprises applying a high frequency magnetic flux to and across the edges with said flux extending through and concentrated in the facing edges along a length thereof extending over the zone of contacting of said edges and a distance prior thereto to induce a heating current within the edges to heat the edges to welding temperature before contact by means of a horseshoe core extending about a high frequency conductor with the feet of said horseshoe core placed on opposite sides of said edges and closer to said pipe than the spacing between said feet and the spacing between said feet less than the width of said conductor, and relatively moving said edges and said magnetic flux along said seam with the progressive contacting of said edges, and thereby heating substantially only the edges of said seam to welding temperature prior to and during contact to effect said weld.

50. In the method of making cylindrical steel pipe from sheets of steel in which the sheets of steel are progressively, along the length thereof, bent into cylinders with facing edges forming a seam and the edges of the seam heated, contacted by pressing, and welded together progressively along the seam to form the welded pipe, the improvement for effecting welding of the edges of the seam which comprises passing a high frequency electric current parallel to, close to said seam, and in a plane determined substantially by the contacting faces of the edges and extending equally spaced between said faces before contact so that high frequency magnetic flux resulting from said current extends into the edges of said seam across the faces of the edges and along a length thereof over the zone of contacting of said edges and a distance prior thereto, concentrating and directing high frequency magnetic flux surrounding said current into the edges of said seam and across the faces thereof along said length by means of a horseshoe core extending about a high frequency conductor with the feet of said horseshoe core placed on opposite sides of said edges and closer to said pipe than the spacing between said feet and the spacing between said feet less than the width of said conductor, to induce a heating current within the edges travelling substantially parallel with the faces of the edges to heat the edges to welding temperature before contact, and relatively moving said edges and said current along said seam with the progressive contacting of said edges, and thereby heating substantially only the edges of said seam to welding temperature prior to and during contact to effect said weld.

51. The method as defined in claim 50 in which said relative movement is at such a speed that the metal of the edges does not become overheated and does not conduct too much heat from the narrow band at the edges to the surrounding adjacent portions.

52. In an induction heating unit for heating spaced edges of pieces of metal to be welded together, an elongated conductor for carrying high frequency current, a horseshoe laminated magnetic core embracing and extending about and along said conductor for directing and concentrating the magnetic flux about said conductor when carrying high frequency current into the pieces of metal at said edges, said core having feet spaced apart less than the width of said conductor and extending below said conductor so that said feet may be applied close to said pieces of metal but spaced therefrom with such spacing less than the space between said feet so that the magnetic flux will be preferentially directed into said pieces of metal and across said edges instead of between said feet and when said feet are so positioned said conductor is spaced from said pieces of metal a greater distance than the surfaces of said feet facing said pieces of metal.

53. The method of welding elongated opposed edges of continuously-moving elongated metallic pipe which is C-shaped in cross-section which comprises inducing from above and below the edges substantially equal electrical heating currents of high frequency to flow in a highly concentrated form longitudinally of and only in each of said edges of said C-shaped pipe, without inducing currents elsewhere in said pipe, to heat the edges to welding temperature and contacting said heated edges to effect a weld of said edges.

54. In the method of making cylindrical metal pipe from sheets of metal in which the sheets of metal are progressively along the length thereof, bent into cylinders with facing edges forming a seam and the edges of the seam heated, contacted by pressing, and welded together progressively along the seam to form the welded pipe, the improvement for effecting welding of the edges of the seam which comprises passing a high frequency electric current parallel and close to said seam so that high frequency magnetic flux resulting from said current extends into the edges of said seam across the faces of the edges and along the length thereof over the zone of contacting of said edges and a distance prior thereto, concentrating and directing high frequency magnetic flux surrounding said current into the edges of said seam and across the faces thereof along said length by means of a horseshoe core extending about a high frequency conductor with the feet of said horseshoe core placed on opposite sides of said edges and closer to said pipe than the spacing between said feet and the spacing between said feet less than the width of said conductor, to induce a heating current within the edges to heat the edges to welding temperature before contact, and relatively moving said edges and said current along said seam with the progressive contacting of said edges, and thereby heating substantially only the edges of said seam to welding temperature prior to and during contact to effect said weld.

References Cited in the file of this patent

UNITED STATES PATENTS

| | | |
|---|---|---|
| 1,842,461 | Sessions | Jan. 26, 1932 |
| 1,893,926 | Anderson | Jan. 10, 1933 |
| 1,915,047 | Blakeslee | June 20, 1933 |
| 1,915,082 | Blakeslee | June 20, 1933 |
| 1,981,629 | Northrup | Nov. 20, 1934 |
| 2,020,276 | Crawford | Nov. 5, 1935 |
| 2,084,889 | Blevins | June 22, 1937 |
| 2,209,637 | Sessions | July 30, 1940 |
| 2,460,687 | Fuchs | Feb. 1, 1949 |
| 2,464,402 | Kentis | Mar. 15, 1949 |
| 2,480,299 | Klinke | Aug. 30, 1949 |
| 2,528,758 | King | Nov. 7, 1950 |
| 2,561,462 | Compton et al. | July 24, 1951 |
| 2,575,381 | Colby | Nov. 20, 1951 |
| 2,582,955 | Body | Jan. 22, 1952 |
| 2,582,963 | Cachat | Jan. 22, 1952 |
| 2,672,544 | Finchelstein et al. | Mar. 16, 1954 |

OTHER REFERENCES

Gould: A. I. E. E. Misc. Paper 50–101, December 1949.